United States Patent [19]

Toal, Jr.

[11] Patent Number: 4,797,671

[45] Date of Patent: Jan. 10, 1989

[54] MOTOR VEHICLE LOCATOR SYSTEM

[76] Inventor: Robert P. Toal, Jr., 3545 Carman Road, Schenectady, N.Y. 12303

[21] Appl. No.: 3,644

[22] Filed: Jan. 15, 1987

[51] Int. Cl.⁴ .......................... H04Q 7/00; H04B 7/00
[52] U.S. Cl. ..................... 340/825.490; 340/825.690; 340/51
[58] Field of Search ..................... 340/825.49, 539, 51, 340/825.69, 825.72, 75, 88, 331, 332, 326, 327

[56] References Cited

U.S. PATENT DOCUMENTS

| | | | |
|---|---|---|---|
| 2,367,960 | 1/1945 | Parfitt . | |
| 3,506,956 | 4/1970 | Kolm et al. | 340/825.69 |
| 3,665,313 | 5/1972 | Trent | 340/825.49 |
| 3,668,526 | 6/1972 | Raskin | 340/539 |
| 4,023,138 | 5/1977 | Ballin | 340/539 |
| 4,101,873 | 7/1978 | Anderson et al. | 340/539 |
| 4,143,368 | 3/1979 | Route et al. | 340/543 |
| 4,236,594 | 12/1980 | Ramsperger | 180/167 |
| 4,360,808 | 11/1982 | Smith et al. | 340/825.76 |
| 4,413,261 | 11/1983 | Greenberg | 340/825.72 |
| 4,446,460 | 5/1984 | Tholl et al. | 340/825.69 |
| 4,476,469 | 10/1984 | Lander | 340/825.49 |
| 4,507,653 | 3/1985 | Bayer | 340/539 |
| 4,673,921 | 6/1987 | Saito et al. | 340/51 |

FOREIGN PATENT DOCUMENTS 2016576A 9/1979 United Kingdom ................ 340/539

OTHER PUBLICATIONS

Patent Trademark Office Official Gazette, Jul. 9, 1985 pp., tm 56;tm 175.
Carfinder ® model 007 Installation Manual; advertisement in Nov. 1986 issue of "Changing Times" magazine, p. 131; and Official Gazette for Trademarks—Sep. 17, 1985 edition page TM 125; advertisement in Holiday 1985 issue of "Synchronics", p. 2.

*Primary Examiner*—Donald J. Yusko
*Attorney, Agent, or Firm*—Heslin & Rothenberg

[57] ABSTRACT

A system is disclosed for identifying the location of a parked and unattended motor vehicle. When user actuated, the sought-after vehicle will emit a distinctive, user programmable audible and/or visual attention getting signal. Such a signal is preferably produced by standardly furnished vehicular equipment (e.g., horn and headlights). The system utilizes a radio frequency operated communications link between the operator and the vehicle which is also user programmable. Such programmability allows the user to select one of a plurality of possible link operating frequencies thus greatly reducing the likelihood that his system will inadvertently actuate similar nearby systems.

18 Claims, 4 Drawing Sheets

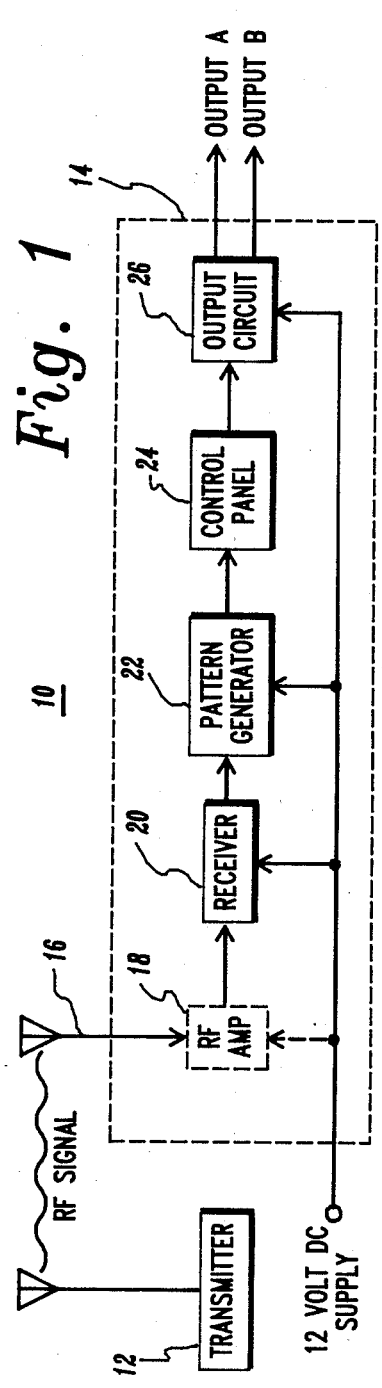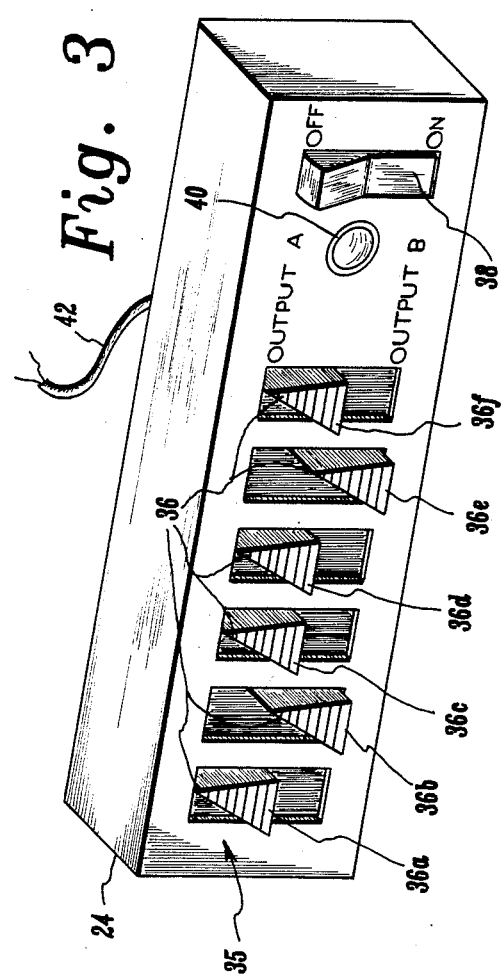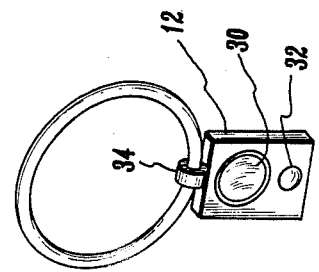

MOTOR VEHICLE LOCATOR SYSTEM

BACKGROUND OF THE INVENTION

The present invention relates in general to motor vehicles, and more particularly, to a system for pinpointing the location of a parked motor vehicle. When activated by the user at a point distant from the sought after vehicle, the system causes the vehicle to emit a distinctive, attention getting, audible signal or visual signal, or a combination of both (hereinafter referred to as an audible/visual signal), thus locating the vehicle for the user.

In today's world, it is a frequent occurrence for people to park and leave their motor vehicle in large and highly congested parking areas such as those found at shopping centers and airports. Upon returning to the parking area to retrieve their vehicle, they quite occasionally find themselves enmeshed in an annoying and time consuming scenario of trying to locate their vehicle amongst all the other seemingly look-alike vehicles in the lot. Search time can be extended appreciably with the onset of darkness or inclement weather, perhaps leading to a very exasperating and potentially dangerous situation.

One proposed solution to the problem is disclosed by Kolm et al. in U.S. Pat. No. 3,506,956. This patent described an automobile recognition system which employs a specially designed illuminating automobile fixture which when activated emits a visual signal to assist an owner in locating his car. The illuminating automobile fixture is activated by an acoustical switch in response to an audible whistle blast of a particular frequency produced by the owner in the general vicinity of his car. The Kolm et al. system includes a variable resistor which allows the owner to vary the rate at which the illuminating automobile fixture flashes, supposably thereby enhancing the owner's ability to identify his particular automobile in a lot containing a number of vehicles equipped with such a sound sensitive identification system.

The Kolm et al. automobile recognition system, however, has several inherent drawbacks. For example, the signaling scheme used offers little opportunity for system individuality, either in terms of the location identifying signal emitted in response to a whistle blast or the transmitter/receiver system activation link. In a parking lot having a large number of automobiles fitted with such a recognition system, one operator's whistle blast is likely to inadvertently set off several systems, which would impair the operator's ability to recognize his own activated system and thwart the system's intended purpose of clearly signaling the location of a specific parked vehicle. As the Kolm et al. patent describes, some limited system individuality is obtained by varying the rate at which the owner's fixture flashes, and possibly the fixture's color and/or shape. The owner, however, would still have to determine from flashing rate, color and/or shape, which system in a plurality of activated systems is indicating the location of his parked vehicle. In addition, the system activation signaling scheme used requires the operator activating the system to be within a limited range of his motor vehicle and to direct the ultrasonic transmissions in the general direction of the vehicle being sought. An additional shortcoming of this system is that it only produces a visual signal, thereby making it less effective in daylight.

Thus, there presently exists a genuine need for a motor vehicle locator system which has an easy to use, reliable, operator programmable, activation scheme and which when activated provides a unique operator selectable location identifying signal consisting of a readily discernable audible/visual pattern.

SUMMARY OF THE INVENTION

Accordingly, a principal object of the present invention is to provide a motor vehicle locator system which when activated provides a readily discernable, unique, operator programmed audible/visual signal pinpointing the sought after vehicle's location.

Another object of the present invention is to provide a motor vehicle locator system which is operator actuated from a remote location by a distinct, operator selected signal.

Yet another object of the present invention is to provide a vehicle locator system which utilizes standardly supplied motor vehicle equipment to signal the vehicle's location.

Still another object of the present invention is to provide a vehicle locator system which is capable of actuation from a great distance using an omnidirectional transmission signal.

A further object of the present invention is to provide a vehicle locator system which is easy to use, rugged, reliable, compact and inexpensive to manufacture.

Briefly, the present invention satisfies these objects by providing an operator actuated motor vehicle locator system having an easily carried, miniaturized transmitter capable of generating a transmission signal. A receiver, mounted within the motor vehicle, responds to the presence of a transmission signal by outputting a trigger signal. The trigger signal activates a pattern generator connected to the output of the receiver which in association with an operator programmed control panel, outputs one of a plurality of potential pattern signals. Translation means is provided at the output of the control panel to translate the outputted pattern signal into a unique pulsing audible/visual indication of motor vehicle location.

In a further aspect of the present invention, the transmission signal consists of an operator selected digitally encoded radio frequency signal and the receiver is preprogrammed to respond only to the selected transmission signal, thereby significantly reducing the chance that an operator's transmitter could inadvertently activate other motor vehicle locator systems.

BRIEF DESCRIPTION OF THE DRAWINGS

While the specification concludes with claims particularly pointing out and distinctly claiming the present invention, the objects, features and advantages of the present invention can be more readily ascertained from the following description of one preferred embodiment when read in conjunction with the accompanying drawings in which:

FIG. 1 is a block diagram representation of the motor vehicle locator system of the present invention;

FIG. 2 is a near actual size perspective view of the miniature transmitter represented in block form in FIG. 1;

FIG. 3 is a perspective view of the remote mounted control panel represented in block from in FIG. 1;

DETAILED DESCRIPTION OF THE INVENTION

Figure 4A:
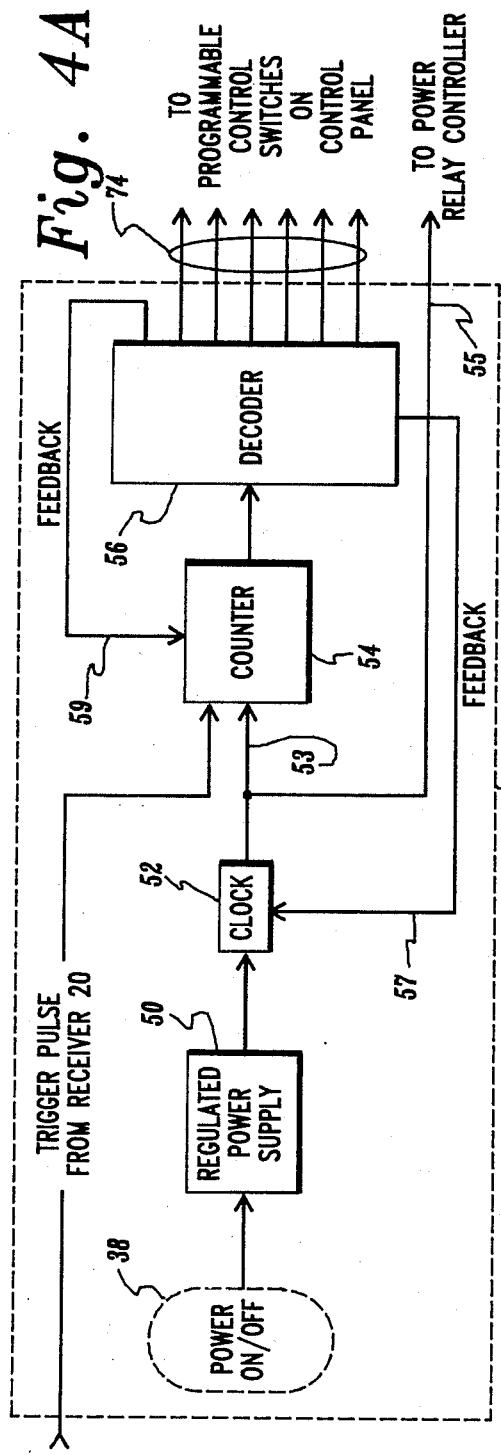
FIGS. 4A and 4B are more detailed block diagram representations of the pattern generator, control panel and output circuit of FIG. 1.

As noted briefly above, incorporated into the present invention are several improvements over existing vehicle recognition systems. A miniature operator-actuated transmitter is used to generate an operator selected digitally encoded radio frequency transmission signal. A companion receiver, located within the motor vehicle, it operator programmed to respond only to the selected transmission signal. The signaling flexibility offered by this programmable transmitter/receiver system significantly reduces the chance that a particular operator's transmitter will inadvertently activate other vehicle locator systems.

The transmission signal activates circuitry associated with the vehicle to produce a unique attention getting signal which consists of either audible or visual pulses, or both. Numerous items, standard on most vehicles, can accomplish such a signaling function, e.g., the horn, headlights, domelights, and/or flashers (other items such as a siren, bell, or rotating beacon, could also be used). A distinctive feature of the present system is that the operator can, with ease, selectively program the audible/visual signal to be emitted by his locator system. This programmability feature not only allows the operator to customize the audible/visual signal emitted by his system so as to be readily distinguishable from other systems which could be inadvertently activated, but also it allows the operator to program the audible/visual signal as is appropriate considering the time of day and location of the parked vehicle. Each of these aspects of the present invention is discussed further below.

One embodiment of the motor vehicle locator system, generally denoted 10, is illustrated in FIG. 1. Locator system 10 includes a radio frequency transmitter 12 and vehicle mounted subsystem 14. Subsystem 14 consists of: an antenna 16, which may be either the vehicle's existing radio antenna or an auxillary antenna (e.g., a flexible wire imbedded in a clear plastic strip capable of being affixed to a windshield); a radio frequency amplifier 18, which is optional (and therefore shown in broken lines); a receiver 20; a pattern generator 22; a control panel 24; and an output circuit 26. In the detailed embodiment of locator system 10 described below, the transmitter/receiver communication system has an operational range of approximately 250 feet without amplification. Thus, if greater range is desired, radio frequency amplifier 18 may be included as part of locator system 10. As shown, amplifier 18, receiver 20, pattern generator 22 and output circuit 26 operate on a required 12 volt dc power supply, such as the vehicle's battery.

Preferrably, optional amplifier 18, receiver 20, pattern generator 22 and output circuit 26 are packaged in a single compact container which is mounted behind the vehicle's dashboard near required vehicle electrical connection points. Control panel 24 is remotely located from this container, preferrably being mounted on the vehicle's dashboard for easy owner or operator access.

An enlarged perspective view of one embodiment of a miniature transmitter 12 is shown in FIG. 2. Miniature transmitter 12 has an activation button 30 which when operator actuated causes transmitter 12 to generate and output an omnidirectional, operator programmed digitally encoded radio frequency transmission signal as discussed below. A light emitting diode (hereinafter LED) 32 is provided as feedback that transmitter 12 is energized when button 30 is pressed. A loop or ring 34 secured to transmitter 12 facilitates owner or operator carrying by allowing attachment to a keychain, necklace, bracelet, etc.

Receiver 20, located within the compact container mounted within the vehicle, is operator programmed to respond only to the selected radio frequency transmission signal outputted by transmitter 12. Both transmitter 12 and receiver 20 feature a coding system which enables the operator to select one of a plurality of digital codes, e.g. through an accessible, programmable encoding DIP switch in transmitter 12 (not shown) and an identical accessible, programmable decoding DIP switch in receiver 20 (not shown). One such transmitter/receiver communication system is manufactured by Linear Corporation of Carlsbad, California, and marketed as Transmitter ET-2 and Receiver DX-12. This particular transmitter/receiver system allows the operator to select the radio frequency transmission signal by matching eight bit DIP switch settings available on the transmitter's encoder and receiver's decoder, which in effect allows the operator to chose from 256 possible coded transmission signals. This large number of possible transmission signals virtually ensures in practice that system 10 will not inadvertently activate other locator systems, or in turn be activated by a similar system. Multiple transmitters 12 may be identically coded, thus allowing more than one owner or operator of a vehicle to retain posession of their own system activation transmitter.

Returning to FIG. 1, upon receipt of a proper transmission signal, receiver 20 responds by outputting a trigger signal (or trigger pulse) to pattern generator 22, which in combination with control panel 24 and output circuit 26, activates for discreet time intervals predefined, standard motor vehicle equipment items in a readily discernable operator programmed location identifying signal. Specifically, in response to the trigger panel, pattern generator 22 in association with control panel 24 serially output a pattern signal to output circuit 26. Output circuit 26 sequentially transforms the delivered pattern signal into the desired location identifying signal by controlling the application of power to the selected signaling items connected to outputs A and B. Two different standard vehicle equipment items are selectively operable in this manner to allow for a distinctive operator programmed location identifying signal. Outputs A and B are preferably connected to the vehicle's horn and lights, respectively, to allow the operator to program the system for either an audible or visual location identifying signal, or a combination of both.

Control panel 24 provides the means by which an operator can easily program and reprogram the particular identifying signal to be emitted by locator system 10. As shown in FIG. 3, control panel 24 includes a panel 35 of a plurality of operator programmable code switches 36. In addition, a locator system on/off switch 38 and an accompanying pulsating LED 40 are provided for convenient system control LED 40 is connected so as to be activated when locator system 10 is energized, i.e. when switch 38 is at the "on" position. Cable 42 connects control panel 24 to the remaining vehicle mounted components 14 (FIG. 1).

In one alternate embodiment of the present invention, one of ordinary skill in the art could provide switch means (not shown) on control panel 24 for direct control over the operations of pattern generator 22. For example, system 10 could be designed to have a normal mode of operation and an emergency mode of operation. In the normal mode of operation (e.g., the embodiment discussed in detail below), pattern generator 22 could automatically discontinue deliverance of a pattern signal to output circuit 26 once the desired, operator programmed identifying signal has been emitted a discreet number of times, such as once (as described below), twice, etc. In the emergency mode of operation, once activated pattern generator 22 could continually deliver a pattern signal to output circuit 26 until manually deactivated. This mode could be used by an operator of a vehicle to signal for assistance in an emergency situation.

In the detailed embodiment discussed further below, each code switch setting on control panel 24 is translated into a discrete pulse within the location identifying signal emitted by the system when remotely activated through transmitter 12. For example, if there are six code switches 36a, 36b, 36c, 36d, 36e, and 36f as shown, and output A of locator system 10 is connected to the vehicle's horn and output B of locator system 10 is connected to the vehicle's lights, setting or programming all code switches 36 to output A will result in six distinct horn blasts whenever vehicle locator system 10 is activated to emit a location identifying signal. Alternatively, code switches 36 can be programmed in any desired pattern of output A and output B settings, which will result in a toggling of the emitted signal between the vehicle's horn and lights in an identical or correlated pattern. Conversely if code switches 36 are all set to output B, only the vehicle's lights would be enabled in six distinct pulses.

The capability of being able to program the sought after vehicle attention getting signal is an important feature of the present invention. Should, for example, 256 distinct programmable transmitter/receiver transmission signals be insufficient to avoid inadvertent activation of other systems, the 64 (i.e., if there are six code switches 36 and two signaling items) different vehicle location identifying signal patterns available will virtually guarantee that an owner or operator will easily recognize his vehicle's identifying signal from that emitted by any other system. Additionally, the flexibility of being able to program the attention getting signal greatly enhances the utilization value of the system should a different transmitter/receiver communications link be used that has only one, non-user selectable, frequency. Finally, as mentioned briefly above, the ability to program the particular location identifying signal emitted by system 10 allows the operator to set the signal to be emitted with a consideration of the conditions under which the vehicle is parked. For example, if it is daylight, the operator can program the system to include a plurality of horn blasts or pulses in the emitted signal. Alternatively, if a vehicle is parked in a quiet zone, such as a hospital parking lot, or is parked at night, the operator can program the system to only output a visual signal consisting of a plurality of light pulses.

One embodiment of pattern generator 22, control panel 24, and output circuit 26, will now be described with reference to FIGS. 4A and 4B. Power on/off switch 38 (shown for purposes of discussion in phantom within pattern generator 22) is located on control panel 24 to provide convenient operator control over a regulated power supply 50 located within pattern generator 22. Power supply 50 drives a clock 52, the output of which is connected to a counter 54, via line 53, and output circuit 26 via line 55. Clock 52 generates a standard square wave signal which serves the dual function of providing a clocking or pulsing signal to counter 54 and an operation signal to output circuit 26 for controlling a power relay 62 discussed below.

When in operation, counter 54 sequentially counts pulses within the clock signal received from clock 52 and continually outputs the count to a decoder 56. Decoder 56 translates each sequential count into a different read signal, which taken together form a read signal pattern. Connected in parallel at the output to decoder 56, via a plurality of lines generally denoted 74, are programmable code switches 36 located on control panel 24. Each read signal produced by decoder 56, activates a different line 74 such that a different code switch setting is read. As each code switch setting is sequentially read in this manner, the resulting code switch state information (or signal unit) is serially outputted as a pattern signal via line 75 to a pattern relay control circuit 64 within output circuit 26. Pattern relay control 64 directs or controls, via line 63, the state of the coil within an electromechanical pattern relay 66. Pattern relay 66 is a single pole double throw relay in this illustrated embodiment of the present invention. Its outputs, output A on line 80 and output B on line 84, are wired to the motor vehicle horn 82 and lights 86, respectively. Pattern relay control 64 therefore, sequentially directs pattern relay 66 to either enable output A on line 80 or output B on line 84 depending upon the state of each code switch as they are read.

In the preferred embodiment of the present invention, power is supplied to either output A or output B for certain predefined time intervals such that there is a discreet pulsing of either the vehicle's horn or lights. This pulsing effect prevents the run on that would otherwise occur should two of the same signals be programmed back to back. For example, if two neighboring code switches were programmed to output A and there was not pulsing of the power supplied to output A there would be one long horn blast rather than two discrete horn blasts, which would be more difficult for the operator to discern among a plurality of activated systems. Thus, a power signal which is high for predefined, discrete time intervals is supplied via line 70 to the input to pattern relay 66. This power application time interval must be shorter than that period of time for which pattern relay 66 is enabling output A or output B in response to the code switch state information from a particular code switch 36 in order to achieve a pulsing effect at output A or output B without loss of code switch state information.

The power signal received by pattern relay 66 is produced by a power relay 62 and its control, power relay controller 60. Power relay controller 60 controls via line 61, the state of the coil within electromechanical power relay 62. Power relay 60 need only be a single pole single throw relay in this embodiment of the present invention. As mentioned previously the clock signal from clock 52 is available on line 55 which is the input to power relay control circuit 60. The output to power relay 62 is enabled by power relay controller 60 for a time period equal to the amount of time that the clock signal from clock 52 is of a particular value, e.g., a high value. The input to power relay 62, via line 68, is a 12 volt dc power source, such as the vehicle's battery.

In operation, a trigger pulse is outputted from receiver 20 in response to a received transmission signal from transmitter 12. This trigger pulse is inputted to counter 54, which had previously been set to a zero count by a feedback signal from decoder 56 sent via line 59 after the previous vehicle location identifying signal was emitted. (In this discussion it is assumed locator system 10 is activated with switch 38 set to "on".) Receipt of the trigger pulse results in counter 54 outputting a first count to decoder 56. Decoder 56 in turn outputs a first read signal on a particular line 74, such as a first line connected to a first code switch, which results in the state of the code switch being read and outputted to pattern relay controller 64 on line 75 as a first signal unit within the pattern signal to be sent to output circuit 26. This code switch state information is transformed by pattern relay controller 64 into a coil control signal for pattern relay 66 to enable the appropriate output selected by the operator through the read code switch.

Receipt of a first count by decoder 56 also causes the decoder, which had previously discontinued the operation of clock 52 with a feedback signal via line 57 after the last vehicle location identifying signal was emitted, to release its hold on clock 52. Once decoder 56 releases its hold, clock 52 produces and outputs to counter 54 and output circuit 26 the clock signal. Upon receipt of the first clock pulse within the clock signal, counter 54 moves the count to two. Decoder 56 then reads the second code switch and sends the resulting switch state information to output circuit 26. With receipt of the first clock pulse via line 55, power relay controller 60 enables the output to power relay 62 for a time interval equivalent to the amount of time the clock signal pulse is high. When power relay 62 is enabled, a 12 volt dc power signal is outputted to pattern relay 66. Pattern relay 66 in turn applies the power signal to a particular vehicle equipment item through enablement of either output A or output B as programmed by the operator with the first code switch setting. The process continues until all code switches 36 have been read and a corresponding signal has been emitted for each.

After counter 54 has reached a predefined count, which in this case equals the number of code switches positioned on control panel 24, decoder 56 disrupts operation of clock 52 via feedback line 57 and resets counter 54 to zero. While clock 52 is prevented from outputting a clock signal, the input to power relay controller 60 via line 55 is low, which means the output to power relay 62 is not enabled. Thus, no power signal is outputted to pattern relay 66 and the vehicle's horn and/or lights cannot be activated through system 10, at least not until another transmission signal is received from transmitter 12 at which point the above identifying signal generation process repeats.

Figure 4B:
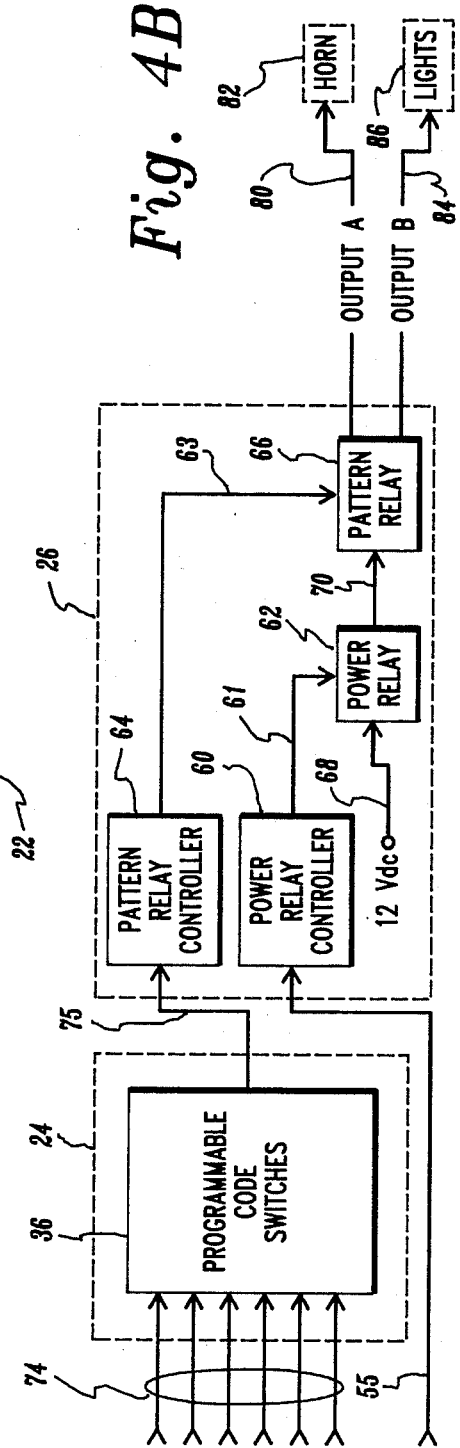
Figure 5A:
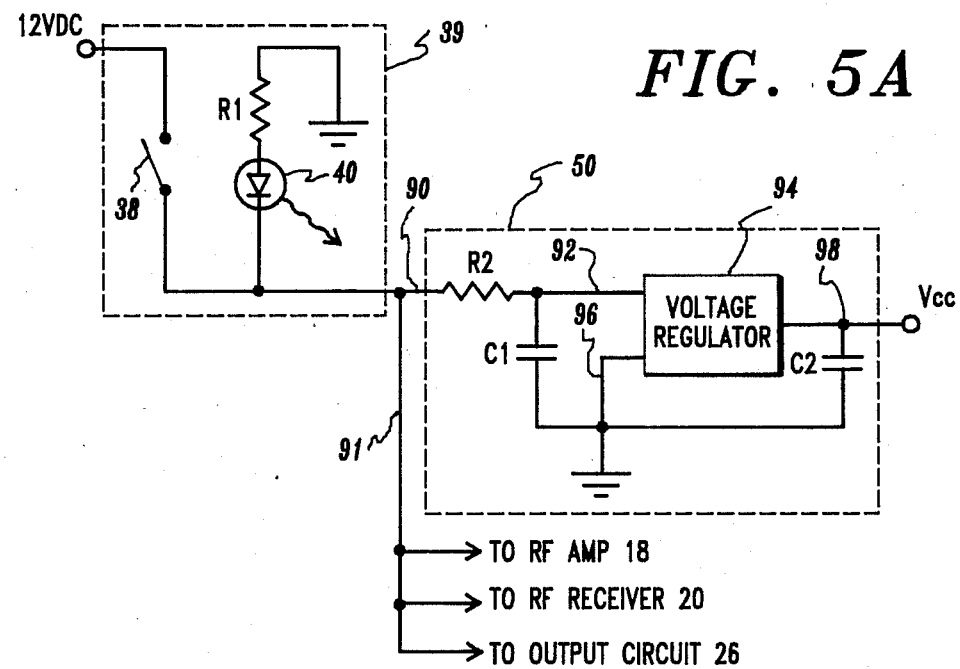
FIGS. 5A-E are schematic representations of one embodiment of the pattern generator, control panel and output circuit components shown in FIGS. 4A and 4B.

Detailed schematic representations of the circuit components represented in block diagram form in FIGS. 4A and 4B are shown in FIGS. 5A-5E. Referring first to FIG. 5A, power supply 50 is powered by a standard 12 volt dc motor vehicle battery (not shown). Components 39, consisting of switch 38, a flashing light emitting diode (LED) 40 and a current limiting resistor R1, are mounted within control panel 24, which as discussed above is positioned within the vehicle's passenger compartment for easy operator access. Locator system on/off switch 38 is connected in series with LED 40 and current limiting resistor R1 so that when switch 38 is closed, LED 40 is activated and when switch 38 is opened, LED 40 is deactivated. LED 40 is a common, commercially available, circuit component (e.g. Radio Shack markets a suitable LED which blinks when activated, Catalog No. 276-030). An appropriate limiting resistance R1 between LED 40 and ground is 500 ohms. As shown, switch 38 is preferably a master switch which controls application of the required 12 volt dc power supply, via line 91, to radio frequency amplifier 18, radio frequency receiver 20, and output circuit 26, and, via line 90, to pattern generator 22 at the input to regulated power supply 50.

When switch 38 is closed, 12 volts dc is supplied to regulated power supply 50 on line 90, where it is applied across a current limiting resistor R2 to an input 92 of a voltage regulator 94. Voltage regulator 94 is grounded via line 96 as shown and a line filter capacitance C1 is connected across input 92 and ground. The output $V_{cc}$ of voltage regulator 94, supplies a steady 5 volts dc to various circuit components discussed below. A filtering capacitor C2 for voltage regulator 94 is connected between output terminal 98 and ground. Appropriate values for limit resistor R2, filtering capacitor C1 and filtering capacitor C2 are 50 ohms, 470 microfarads and 1 microfarad respectively. Voltage regulator 94 is manufactured by a number of companies and marketed in the industry as type number 7805.

Figure 5B:
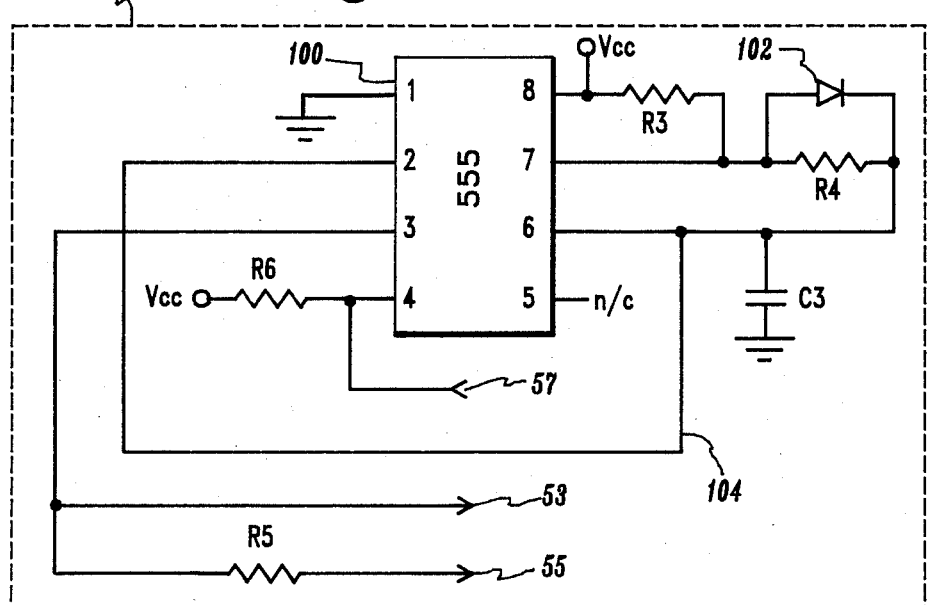

As shown in FIG. 5B, clock 52 is implemented by an integrated circuit 100, type 555. Pin 1 of integrated circuit 100 is grounded and pin 5 has no connection (n/c). Pins 2, 6, 7 and 8 are connected in a standard timing configuration. As shown, voltage $V_{cc}$ is applied to pin 8 and to pin 7 across a resistor R3. Pin 7 is connected to pin 6 through a resistor R4 which has a parallel connected diode 102. A capacitor C3 is connected across pin 6 and ground and pin 6 is connected directly to pin 2 via line 104. With this timing configuration, a clocking period of approximately one second (i.e., approximately 0.75 seconds high and 0.25 second low) is obtained with resistances R3 and R4 each 80 k ohms and capacitor C3 10 microfarads. Diode 102 is a commercially available small signal silicon diode, Part No. 1N4001.

The clocking signal generated by integrated circuit 100 appears at pin 3, which as discussed above, is connected to counter 54 via line 53 and output circuit 26 via line 55. A current limiting resistor R5, e.g., 5.1 k ohms, is located on line 55. Pin 4 of integrated circuit 100 serves as a clock reset. Voltage $V_{cc}$ supplies a high value input to pin 4 across a limiting resistor R6, e.g., 2.2 k ohms, when clock 52 is operating. Once a complete vehicle location identifying signal is emitted, decoder 56 forces pin 4 low by grounding reset feedback line 57, which in turn disables clock 52, preventing a clocking signal from being outputted at pin 3.

Figure 5C:
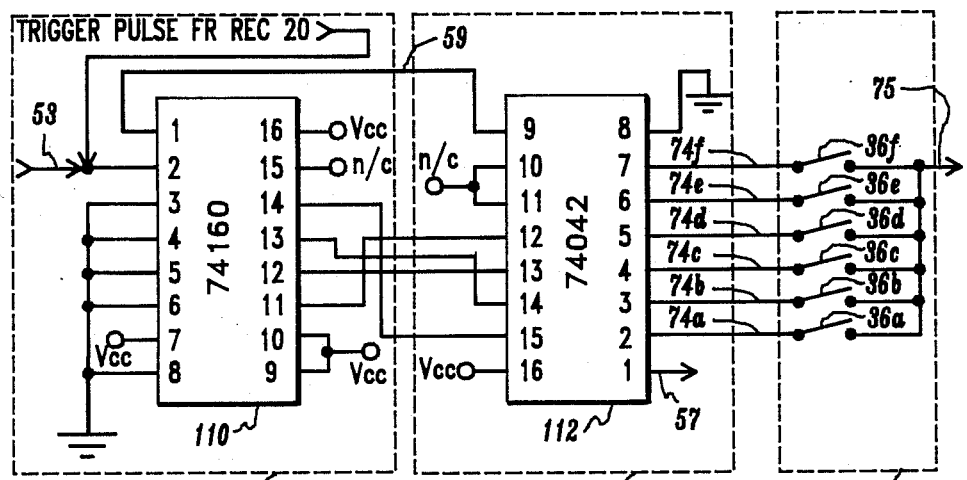

Referring to FIG. 5C, counter 54 is implemented by an integrated circuit 100, type 74160. Pins 3, 4, 5, 6, and 8 of integrated circuit 110 are grounded and pins 7, 9, 10, and 16 are connected to voltage source $V_{cc}$. Pin 1 is connected to reset feedback line 59 from decoder 56, while pin 15 has no connection (n/c). Signal pulses, i.e., the trigger pulse from receiver 20 and clocking pulses within the clocking signal from clock 52 (received via line 53), are inputted to integrated circuit 110 at pin 2. Integrated circuit 110 counts each pulse at pin 2 and continually outputs a count in binary form at pins 11-14. The count at any given time is representative of the total number of pulses inputted to pin 2 since integrated circuit 110 began counting.

Decoder 56 is implemented by an integrated circuit 112, type 74042. Pin 8 of integrated circuit 112 is grounded and voltage source output $V_{cc}$ is applied to pin 16 to power circuit operation. No connections are made to pins 10 and 11. Pin 9 is connected to pin 1 of integrated circuit 110 via reset feedback line 59. Input to integrated circuit 112 is at pins 12–15. Specifically, pins 12, 13, 14, and 15 of integrated circuit 112 are wired to pins 11, 12, 13, and 14 of integrated circuit 110, respectively. The output of integrated circuit 112 is available at pins 2–7. Each output pin 2, 3, 4, 5, 6, and 7 is connected to a particular code switch 36a, 36b, 36c, 36d, 36e, and 36f within control panel 24 via lines 74a, 74b, 74c, 74d, 74e, and 74f, respectively. In operation, as counter 54 progresses through six pulse counts, decoder 56 activates a different output line 74a–f to read the state of a corresponding code switch 36a–f. The code switch state information is serially outputted to output circuit 26 via line 75 as each code switch is read. Once each of the six code switches 36a–f has been read, integrated circuit 112 outputs at pin 9 a reset signal which is sent via line 59 to reset counter 54 to zero and at pin 1 a clock hold signal which is sent via line 57 to discontinue operation of clock 52 as discussed above.

Pattern relay control circuit 64 and power relay control circuit 60 will be described with reference to FIGS. 5D and 5E, respectively. First, referring to FIG. 5D, pattern relay control circuit components 120 operate to invert the signal received on line 75. Inverter components 120 are needed since when locator system 10 is in an idle state, that is, "on" and not generating a vehicle location identifying signal, decoder 56 outputs a pins 2–7 of integrated circuit 112 a high signal. Thus as discussed below, inverter circuit components 120 ensure pattern relay coil 67 is nonconducting when system 10 is in an idle state and therefore not drawing voltage from the vehicle's battery.

When in operation, the pattern signal consisting of code switch state information serially outputted from control panel 24 on line 75, passes through an inverse diode 122 to junction 124. Voltage source output $V_{cc}$ is also applied to junction 124, across a first limit resistor R7. The signal at junction 124 is in turn applied across a second limit resistor R8 to the base 126 of a drive transistor Q1. When a pattern signal is being outputted to output circuit 26, the signal value at base 126 at any given time is dependent upon the status of the particular code switch 36a–f being read by decoder 56. When reading a code switch state, decoder 56 outputs a low signal at the appropriately corresponding pin 2–7 of integrated circuit 112. If the particular code switch 36a–f being read is closed, current will flow from junction 124 through inverse diode 122 to decoder 56, which in turn results in a low signal at base 126 of transistor Q1. Alternatively, if the particular code switch being read is open, no current flows through diode 122 and base 126 of transistor Q1 is high. Diode 122 is a small signal silicon diode, type 1N4001, and appropriate values for resistors R7 and R8 are 100 k and 220 k respectively. Transistor Q1 is type 2N3904, as are transistors Q2 and Q3 discussed below.

As shown, the emitter 128 of transistor Q1 is grounded and the collector 130 is connected, through a current limiting resistor R9, to the base 132 of a second drive transistor Q2. Also, voltage source output $V_{cc}$ is supplied across a limiting resistor R10 to collector 130 of transistor Q1. When in operation, if base 126 of transistor Q1 is low (meaning transistor Q1 is "off", i.e., nonconducting), base 132 of transistor Q2 is high and transistor Q2 is "on" or conducting. Alternatively, if base 126 of transistor Q1 is high, transistor Q1 is "on" and conducting current from collector 130 to ground, which in turn means that the signal at base 132 of transistor Q2 is low and transistor Q2 is "off". Thus, transistor Q2 is "on" when a low voltage value is present at base 126 of transistor Q1 and is "off" when a high voltage value is present, or put another way, transistor Q2 is "on" when the particular code switch 36a–f being read is closed and is "off" when the particular code switch being read is open. Appropriate current limiting resistive values for resistors R9 and R10 are 15 k ohms and 11 k ohms, respectively.

Figure 5D:
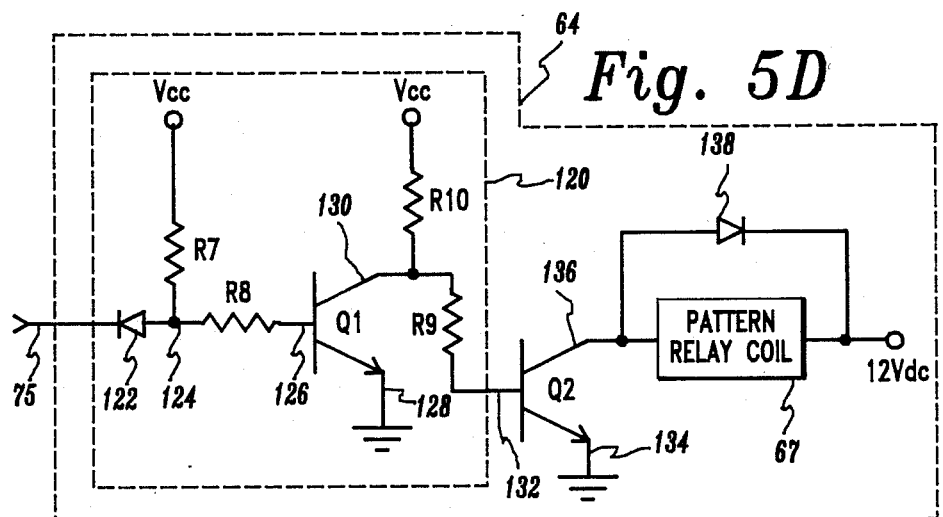

Continuing with FIG. 5D, the emitter 134 of transistor Q2 is grounded and the collector 136 is connected to one side of pattern relay coil 67 (within pattern relay 66, see FIG. 4B), the other side of which is connected to 12 volts dc. As mentioned above, pattern relay 66 is a single pole double throw relay e.g. Radio Shack markets an appropriate relay as a 12 volt MINI-SPDP relay, Catalog No. 275-247. When system 10 is in operation, and transistor Q1 is "off" as described above, transistor Q2 is "on" and pattern relay coil 67 is conducting. Alternatively, when transistor Q1 is "on", transistor Q2 is "off" and pattern relay coil 67 is nonconducting. A diode 138 connected in parallel with pattern relay coil 67 provides circuit relief for excess current within the coil when it changes from a conducting to a nonconducting state. Diode 138 comprises a small signal silicon diode, type 1N4001. The outputs to pattern relay 66 are connected such that output A is enabled when coil 67 is conducting and output B is enabled when coil 67 is nonconducting, output A being connected to the motor vehicle horn and output B being connected to the motor vehicle lights (see FIG. 4B). When the particular code switch 36a–f being read is closed, pattern relay coil 67 is conducting and the motor vehicle horn via output A is enabled. Alternatively, when the particular code switch 36a–f being read is open, pattern relay coil 67 is nonconducting and the motor vehicle lights via output B are enabled. The actual application of power to the vehicle's horn or lights is then dependent upon the power signal outputted from power relay 62.

Figure 5E:
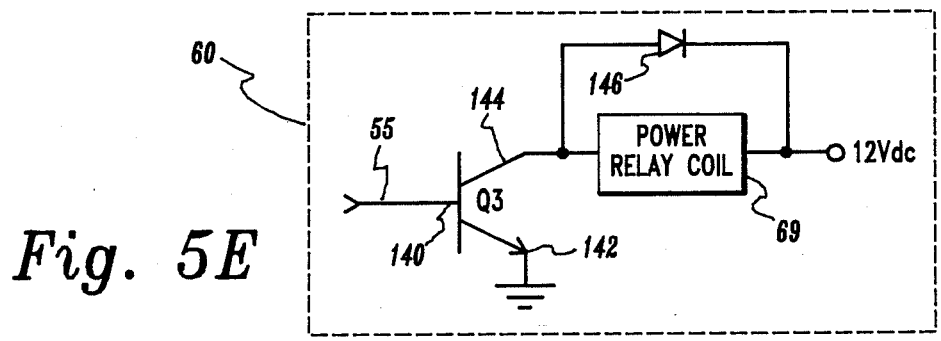

Referring to FIG. 5E, the clock signal produced by clock 52 is received via line 55, by power relay controller 60 at the base 140 of a transistor Q3. The emitter 142 of transistor Q3 is grounded and the collector 144 is connected to one side of power relay coil 69 (within power relay 62, see FIG. 4B), the other side of which is supplied with 12 volts dc. Power relay 62 need only be a single pole single throw relay; however, a 12 volt single pole double throw relay such as that marketed by Radio Shack as MINI-SPDP relay, Catalog No. 275-247 may be used. When system 10 is in operation, the square wave clocking signal received at base 140 of transistor Q3 toggles transistor Q3 between an "on" and "off" state. When the clocking signal is high, transistor Q3 is "on" and power relay coil 69 is conducting and when the clocking signal is low, transistor Q3 is "off" and coil 69 is nonconducting. A diode 146 is connected in parallel with coil 69 to provide circuit relief for excess current when power relay coil 69 changes from a conducting to a nonconducting state. Diode 146 comprises a small signal silicon diode, type 1N4001. During those intervals when power relay coil 69 is conducting, i.e., when the square wave clocking signal is high, 12 volts dc is supplied to pattern relay 66 and hence to either output A or output B of pattern relay 66 as discussed above. Thus, the pulse time interval for which power is applied to either output A or output B (0.75 seconds in the example described) may be easily varied by changing the timing of the square wave clock signal produced by clock 52.

It will be noted form the above that this invention fully meets the objectives set forth. A motor vehicle locator system which is operator programmable to output a unique, easily discernable location identifying signal is provided. In addition, the identifying signal is emitted in response to an operator selected, digitally encoded radio frequency transmission signal. Lastly, the motor vehicle locator system utilizes standard vehicle equipment items to produce the unique location identifying signal.

Although one embodiment has been illustrated in the accompanying drawings and described in the foregoing detailed description, it will be understood that the invention is not limited to the particular embodiment discussed but is capable of numerous rearrangements, modifications, and substitutions without departing from the scope of the invention. For example, the number of programmable code switches or the number of pulses in a location identifying signal may be varied, as may the duration of each emitted pulse within the identifying signal. Other changes, within the scope of the invention as defined by the appended claims, will suggest themselves to those skilled in this art.

I claim:

1. A programmable operator actuated motor vehicle locator system, said system comprising:
    transmitter means for generating a transmission signal;
    receiver means associated with a motor vehicle for outputting a trigger signal in response to said transmission signal;
    a pattern generator connected to the output of said receiver means;
    adjustable programming means associated with said generator for operator preselection of a pattern signal comprising a predefined number of signal units, each of said signal units having one of two different values, said programming means being readily adjustable to allow for operator definition of each signal unit's value, said preselected pattern signal being outputted by said associated pattern generator and programming means in response to said trigger signal; and
    translation means responsive to the output of said associated pattern generator and programming means for converting said operator selected pattern signal into a unique, motor vehicle emitted audible/visual location signal comprising a train of discrete pulses, each pulse of said train comprising an audible or visual signal, each of said signal units being sequentially converted to either an audible or visual signal pulse by said translation means in predefined relation to the operator assigned value thereof, whereby the locator system allows an operator to easily select and modify individual signal pulses within the train of discrete audible or visual signals emitted by the system once activated.

2. The motor vehicle locator system of claim 1, wherein said translation means produces said unique audible/visual indication of motor vehicle location by sequentially activating certain standard equipment items on the motor vehicle.

3. The motor vehicle locator system of claim 2, wherein each distinct activation of a motor vehicle equipment item within said sequence is for a predefined time interval.

4. The motor vehicle locator system of claim 3, wherein said programming means comprises a control panel containing a plurality of readily operator programmable code switches.

5. The motor vehicle locator system of claim 4, wherein said pattern generator produces a predefined read signal pattern in response to said trigger pulse.

6. The motor vehicle locator system of claim 5, wherein the plurality of operator programmable code switches of said control panel are connected in parallel to the output of said pattern generator so that said read signal pattern sequentially reads the state of each programmable code switch, said code switch state information being serially outputted from said control panel as said pattern signal.

7. The motor vehicle locator system of claim 6, wherein said predefined number of signal units within said pattern signal equals the number of code switches on said control panel.

8. The motor vehicle locator system of claim 7, wherein sequentially read state of each programmable code switch comprises one signal unit of said outputted pattern signal.

9. The motor vehicle locator system of claim 8, wherein said transmitter means comprises a miniature operator actuated transmitter capable of generating an operator selected digitally encoded radio frequency transmission signal, and wherein said receiver means comprises a receiver which is operator preprogrammed to respond only to said selected digitally encoded radio frequency transmission signal.

10. The motor vehicle locator system of claim 9, wherein said control panel includes six programmable code switches.

11. The motor vehicle locator system of claim 9, wherein said standard equipment items comprise a horn and light of the motor vehicles.

12. The motor vehicle locator system of claim 9, wherein said control panel is positionable on the motor vehicle's dashboard for convenient operator access.

13. The motor vehicle locator system of claim 12, wherein said control panel further comprises a system on/off switch and a light emitting diode responsive to said switch, said light emitting diode being activated when said system is switched on.

14. The motor vehicle locator system of claim 9, wherein said pattern generator comprises:
    clock means for outputting a clock signal consisting of a train of pulses;
    counting means connected to said clock means for counting pulses and sequentially outputting a pulse count, said counting means being activated by said trigger pulse; and
    decoding means connected to the output of said counting means for translating said pulse count into said predefined read signal and connected to said counting means and said clock means so as to reset said counting means and discontinue operation of said clock means once said predetermined read signal is generated.

15. The motor vehicle locator system of claim 14, wherein said translation means comprises:

voltage means for powering the activation of said vehicle equipment items;

power switch means connected to said voltage means for supplying power from said voltage means to said vehicle equipment items in discrete predefined time intervals; and pattern switch means connected to the output of said power switch means for directing the application of said supplied power for said discrete time intervals to said vehicle equipment items and said pattern switch means being connected to the output of said control panel for directing said supplied power to particular vehicle equipment items in response to said serially outputted pattern signal.

16. The motor vehicle locator system of claim 15, wherein said power switch means comprises:

a power relay control circuit connected to the output of said clock means; and a power relay controlled by said power relay control circuit and connected to the output of said voltage means such that said power relay control circuit controls the application of power from said voltage means to said pattern switch means.

17. The motor vehicle locator system of claim 16, wherein the clock signal from said clock means comprises a square wave signal of high and low values and wherein said power relay control circuit operates said power relay to supply power from said voltage means to said pattern switch means when said square wave signal is at a high value.

18. The motor vehicle locator system of claim 17, wherein said pattern switch means comprises:

a pattern relay control circuit connected to the output of said control panel; and a pattern relay connected to the output of said power relay, said pattern relay being controlled by said pattern relay control circuit so as to direct the application of power from said power relay to said vehicle equipment items in response to said serially outputted pattern signal.

* * * * *